Dec. 3, 1935. H. J. McKAY ET AL Re. 19,780

HYDRAULIC PRESS

Original Filed March 1, 1930 2 Sheets-Sheet 1

Inventors
Hobert J. McKay
Paul J. Carlsen
By Stryker & Stryker
Attorneys

Dec. 3, 1935. H. J. McKAY ET AL Re. 19,780

HYDRAULIC PRESS

Original Filed March 1, 1930 2 Sheets-Sheet 2

Inventors
Hobert J. McKay
Paul J. Carlsen
By Stryker & Stryker
Attorneys

Reissued Dec. 3, 1935 Re. 19,780

UNITED STATES PATENT OFFICE 19,780

HYDRAULIC PRESS

Hobart J. McKay and Paul J. Carlsen, St. Paul, Minn., assignors, by mesne assignments, to The Richardson Company, Lockland, Ohio, a corporation of Ohio Original No. 1,919,070, dated July 18, 1933, Serial No. 432,406, March 1, 1930. Application for reissue February 14, 1935, Serial No. 6,596

7 Claims. (Cl. 18—19)

This invention relates to improvements in hydraulic presses and molds therefor. Heretofore in the operation of hydraulic presses, and particularly those of the heavy duty type where pressures of many thousands of pounds per square inch are applied in the molds, much difficulty has been experienced in separating the mold plates from the molded object after the object has been formed. It will be understood that the high pressures in the mold force the plastic material into the minutest openings, recesses and the like, and this causes an interlocking and strong adherence between the molded object and mold which is capable of resisting considerable force tending to separate the mold from the object. This is particularly true in the formation of irregular objects with reentrant surfaces which must be drawn apart against considerable friction. These difficulties have resulted in relatively slow operation and unnecessary fatigue of the operators.

It is our object to provide a mold adapted to facilitate the removal of the molded object by automatically breaking the seal between the mold and object. Our invention also includes certain other novel features of construction which will be more fully pointed out in the following specification and claims.

Referring to the accompanying drawings which illustrate the best form of our device at present known to us—

Figure 5:
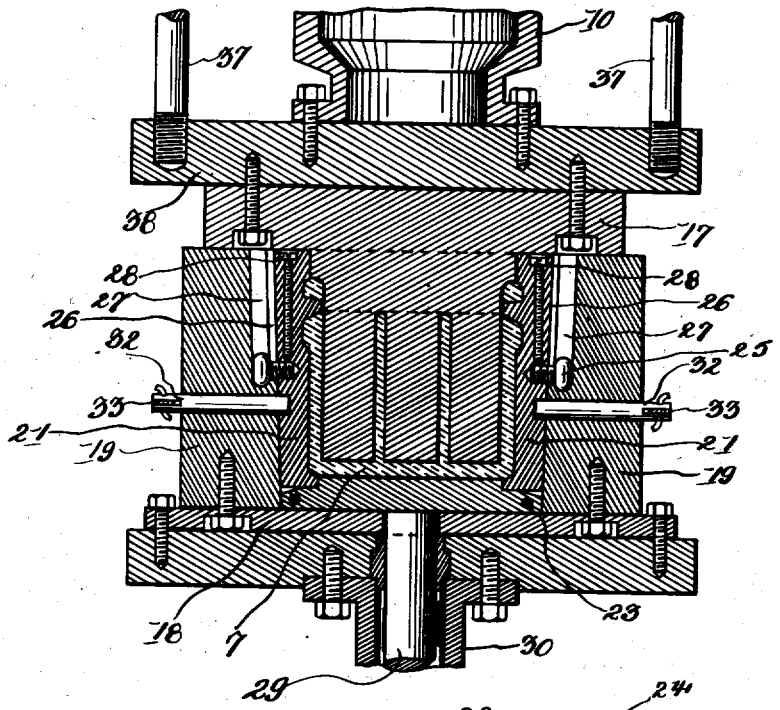
Figure 5 is another central vertical section showing the plunger and mold in operative relation and with the molded object in the mold.

We have illustrated a mold adapted to form a storage battery box or container 7 of common type, but it will be understood that by modifications, which will be obvious to those skilled in the art, the invention may be employed in forming numerous other objects. Bituminous material, such as asphalt and gilsonite, has been mixed in suitable proportions with fibrous material and a filler to constitute a plastic composition for use in measured quantities to form the container 7. The press illustrated is of the type having large and small hydraulic cylinders 8 and 9 respectively for rams 10 and 11. The cylinders 8 and 9 are supported in a suitable frame consisting of large vertical members 12 connected by cross members 13 and supported on a foundation 15. The large ram 10 is adapted to be driven downward, by fluid under pressure supplied through a pipe 16, to extend a plunger 17 into the mold, as best shown in Figure 5. Upon the foundation 15 is secured a stationary platen 18 and secured to the platen 18 is a ring 19 in which is mounted the mold proper. Further details of the press are well understood by those skilled in this art.

Figure 2:
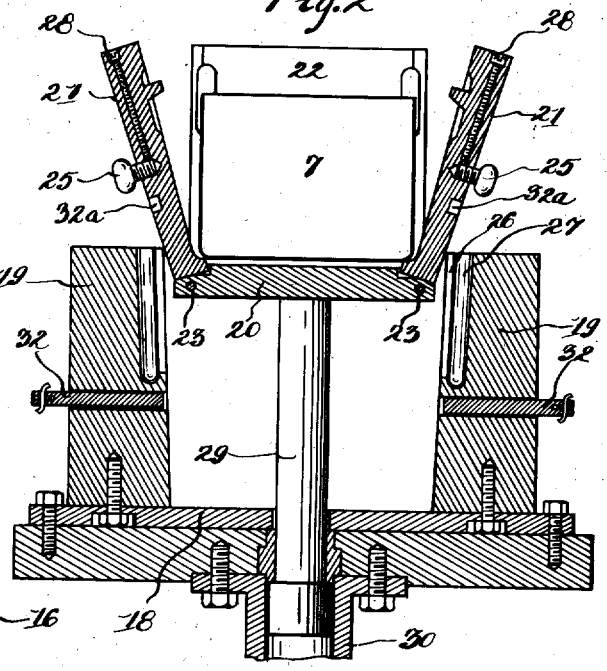
Figure 2 is a similar view on a larger scale of the mold, ring and platen parts of the press.

The interior of the ring 19 is made substantially rectangular in shape and a rectangular bottom 20 of the mold proper is disposed horizontally in the ring, being freely movable upward therein. Hingedly connected to the side edges of the bottom 20 are pairs of side plates 21 and 22 for forming the exterior of the container 7. These side plates 21 and 22 are connected to the bottom 20 by hinge pins 23 and are free to pivot outward from the container 7 when the mold is extended from the ring 19, as illustrated in Figure 2. The end edges of the plates 21 and 22 are formed to fit snugly together when the plates are retracted and confined within the ring 19, suitable rabbeted edges 24 being arranged to fit together and prevent escape of the plastic material at the corners.

Projecting from the outer surfaces of the plates 21 are lugs 25 formed to engage the outer surfaces of guide flanges 26 extending along slots 27 in the inner surfaces of the ring 19. These guide flanges 26, at opposite sides of the ring, diverge slightly from each other upward so as to positively draw the side plates 21 apart when the mold is extended from the ring 19. In other words, these guide flanges 26 as viewed in Figure 2 extend at an angle slightly greater than 90 degrees from the horizontal and the lugs 25 which positively engage said guide flanges, are drawn outward together with the plates 21 as the mold is moved upward relative to the ring 19. The lugs 25 are preferably formed with threaded shanks which are screwed into tapped holes in the plates 21 and held against turning by suitable set screws 28. The plates 22 are provided with lugs 25*a* coacting with guide flanges 26*a*, like the lugs 25 and flanges 26.

Figure 1:
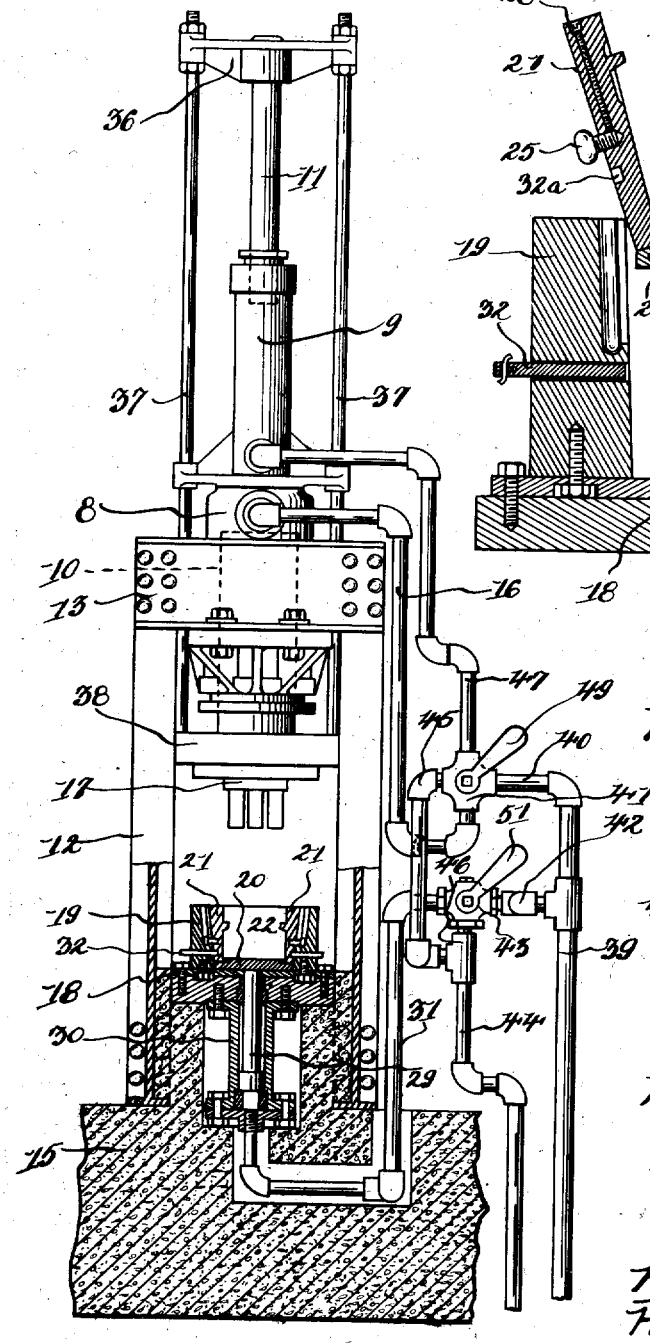
Figure 1 is a central vertical section through our improved mold and showing its mounting in a heavy duty hydraulic press of common type.
Figure 6:
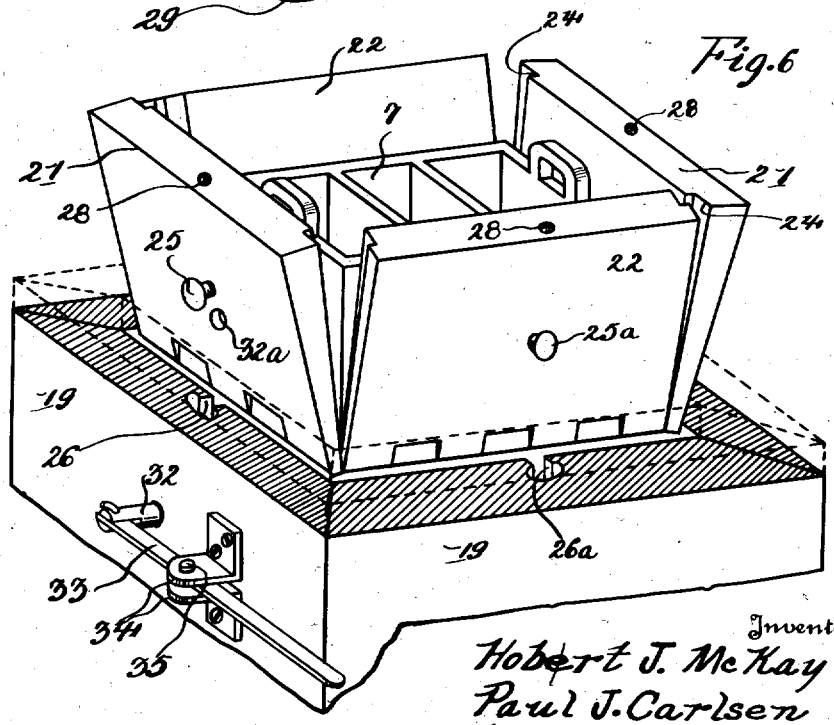
Figure 6 is a perspective view of the mold in open position together with the adjacent portion of the ring with the top of the ring cut away to show the hinge connections for the side plates.

To eject the mold from the ring 19 and cause the plates 21 and 22 to project therefrom we provide a small ram 29. This ram is movable axially upward in the ring from an opening in the platen 18 and a suitable hydraulic cylinder 30 extends downward from the platen and is supplied at its lower end with fluid under pressure from a pipe 31 (Fig. 1). Locking bolts 32 are removably mounted in horizontal openings in the ring 19 and arranged to be extended into recesses 32a in the plates 21. To operate these locking bolts 32, levers 33, as best shown in Figure 6, are pivotally connected to the outer ends of the bolts and each lever has a fulcrum support consisting of brackets 23 secured to the ring 19 and a pivot pin 35 extending through perforations in said brackets and in the lever 33.

Figure 3:
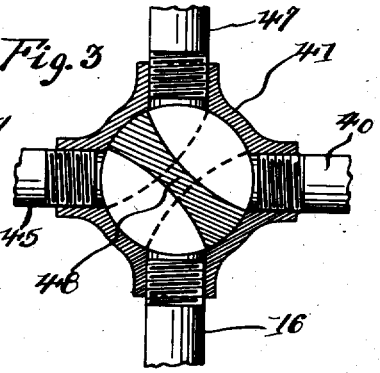
Figures 3 and 4 are diagrammatic sectional views showing suitable valves for controlling the press.
Figure 4:
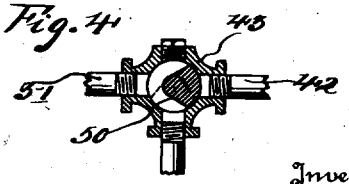

It will be understood that the plunger 17 is constructed to form the interior of the container 7 or other object to be formed. In the press illustrated, the small ram 11 is employed to withdraw the plunger 17 upward after an object has been molded. A cross head 36 is secured to the upper end of the ram 11 and is connected by downwardly extending rods 37 to a top platen 38 carrying the plunger 17. A suitable arrangement of valves and piping for operating the several rams 10, 11 and 29 is shown in Figures 1, 3 and 4. Thus water, or other suitable fluid, under pressure may be supplied from a pipe 39 having a branch 40 communicating with a valve casing 41 and a branch 42 communicating with a valve casing 43. An exhaust pipe 44 has a branch 45 for the valve casing 41 and a branch 46 for the valve casing 43. The pipe 16 for supplying the large ram cylinder 8 is connected to the valve casing 41 and another pipe 47 connects said casing with the cylinder 9 for the ram 11. The pipe 31 communicates with the casing 43. Movable by a handle 49, from the full line to the dotted line position shown in Figure 3, is a valve member 48 in the casing 41 and in the valve casing 43 is mounted a valve member 50 which is movable by a handle 51 to place either the pipe 42 or the pipe 46 in communication with the pipe 31. When the valve member 48 is in the full line position shown in Figure 3, fluid under pressure is admitted to the cylinder 9 while fluid from the cylinder 8 is allowed to exhaust through the pipes 45 and 44. When this valve is in the dotted line position, fluid under pressure is supplied to the large cylinder 8 and fluid from the cylinder 9 is allowed to exhaust.

In operation, assuming that the several parts of the device are in the position shown in Figure 1, a measured quantity of moldable material may be placed in the mold and then the valve handle 49 is operated to extend the ram 10 carrying the plunger 17 downward into the mold, while exhausting fluid from the cylinder 9. This closes the mold, as shown in Figure 5, and forms the container 7. Before the plunger 17 is withdrawn from the mold the levers 33 are operated to extend the locking bolts 32 into the recesses 32a in the plates 21. The locking bolts being so extended, movement of the mold upward through the ring 19 is prevented and the handle 49 may be operated to exhaust the cylinder 8 and supply fluid under pressure to the cylinder 9. This operation of the valve causes the ram 11 to raise the upper platen 38 thereby withdrawing the plunger 17 from the mold. The levers 33 are now operated to withdraw the locking fingers 32 and the valve handle 51 is moved to supply fluid under pressure to the ram cylinder 30 with the result that the ram, engaging the bottom 20 of the mold, thrusts said bottom upward together with the side plates and molded object. During this upward movement the lugs 25 are drawn apart as they slide along the upwardly diverging guide flanges 26, thereby breaking the seal between the molded object and plates. When the mold is fully extended, as shown in Figure 2, the plates 21 readily tilt outward and plates 22 are similarly separated from the object. Finally, the completed container 7 is merely lifted out of the mold and after a simple cleaning operation the valve handle 51 is manipulated to exhaust the ram cylinder 30 and allow the mold and ram 29 to return by gravity to normal position within the ring 19. This completes a cycle of operation.

By hingedly connecting the side plates to the bottom of the mold the operations of opening and closing the mold are facilitated and proper positioning of the sides in sealed relation to the bottom (when the mold is closed) is assured. Our improvements reduce the manual work and make it possible for an operator to produce a substantially larger number of containers or other molded objects in a given period of time.

Having thus described our invention, what we claim as new and desire to protect by Letters Patent is:

1. In a mold for a press having a plunger, a platen and a ring secured to said platen, a mold bottom normally resting on said platen within said ring, sides hingedly connected to said bottom and arranged to be confined within said ring to form a mold with an open top, said plunger being arranged to be extended into the top of said mold to form an object, means for forcibly projecting said sides from the top of said ring, upwardly and outwardly diverging cams formed on opposite sides of said ring and means projecting from the mold sides to engage said cams for opening said sides outward relative to the molded object when the mold is extended from the ring.

2. In a mold for a hydraulic press having a plunger, a platen and a ring secured to said platen, a substantially rectangular mold bottom normally resting on said platen within said ring, sides hingedly connected to said bottom and arranged to be confined within said ring to form a mold with an open top, said plunger being arranged to be extended into said mold to form an object, means for forcibly projecting said sides from said mold, lugs projecting from the outer surfaces of said sides and guides formed in said ring to engage said lugs and forcibly pivot certain of said sides outward when the mold is extended from the ring.

3. In a mold for a press having a plunger, a platen and a ring secured to said platen, a mold bottom normally resting on said platen within said ring, sides movably supported on said bottom and arranged to be confined within said ring to form a mold with an open top, said plunger being arranged to be extended into the top of said mold to form an object, means for forcibly projecting said sides from the top of said ring, upwardly and outwardly diverging cams formed on opposite sides of said ring and means projecting from the mold sides to engage said cams for opening said sides outward relative to the molded object when the mold is extended from the ring.

4. In a mold for a hydraulic press, an internally tapered mold ring, a mold plate assembly consisting of a base plate and four side plates movably supported thereon, said side plates tapered to correspond to and fit snugly against the sides of the ring when said assembly is in molding position, dovetail grooves in the ring, and means on some of the side plates at least engaging the grooves, thereby enforcing a movement of said plates in alignment with said taper, and means for moving the base plate through the ring, thereby causing the plates to move through said ring, whereby said plates will be forcibly separated from a molded object within said assembly.

5. In a mold for a hydraulic press, an internally tapered mold ring, a mold plate assembly consisting of a base plate and four side plates movably supported thereon for enforced up and down movement therewith, said side plates tapered to correspond to and fit snugly against the sides of the ring when said assembly is in molding position, means located below the upper edges of the side plates for enforcing a movement of the side plates into and out of said ring along lines defined by the taper of said ring, said base plate being movable through said ring thus causing the side plates to move therethrough, whereby the plates are directly backed by the ring when in molding position, and caused to separate from a molded article within them when the base is moved to cause the plates to move out through the ring.

6. In a mold for a hydraulic press, an internally tapered mold ring, a mold plate assembly consisting of a base plate and four side plates movably supported thereon, said side plates tapered to correspond to and fit snugly against the sides of the ring when said assembly is in molding position, dovetail grooves in the ring, and means on some of the side plates at least engaging the grooves, thereby enforcing a movement of said plates in alignment with said taper, and means for moving the base plate through the ring, thereby causing the plates to move through said ring, whereby said plates will be forcibly separated from a molded object within said assembly, and disengageable means secured to said ring and engaging at least one of the side plates, thereby preventing the movement of the assembly through said ring during a core withdrawal therefrom.

7. In a mold for a hydraulic press, an internally tapered mold ring, a mold plate assembly consisting of a base plate and four side plates movably supported thereon for enforced up and down movement therewith, said side plates tapered to correspond to and fit snugly against the sides of the ring when said assembly is in molding position, means located below the upper edges of the side plates for enforcing a movement of the side plates into and out of said ring along lines defined by the taper of said ring, said base plate being movable through said ring thus causing the side plates to move therethrough, whereby the plates are directly backed by the ring when in molding position, and caused to separate from a molded article within them when the base is moved to cause the plates to move out through the ring, and disengageable means secured in said ring and engaging at least one of the side plates, thereby preventing the movement of the assembly through said ring during a core withdrawal therefrom.

HOBART J. McKAY.
PAUL J. CARLSEN.